(12) United States Patent
Burns et al.

(10) Patent No.: US 8,390,442 B2
(45) Date of Patent: Mar. 5, 2013

(54) METHOD AND APPARATUS FOR REAL-TIME LOCATION OF ASSETS

(75) Inventors: Patrick E. Burns, Burlingame, CA (US); John P. Norair, Palo Alto, CA (US)

(73) Assignee: Savi Technology, Inc., Alexandria, VA (US)

( * ) Notice: Subject to any disclaimer, the term of this patent is extended or adjusted under 35 U.S.C. 154(b) by 527 days.

(21) Appl. No.: 12/730,376

(22) Filed: Mar. 24, 2010

(65) Prior Publication Data

US 2010/0295681 A1 Nov. 25, 2010

Related U.S. Application Data

(60) Provisional application No. 61/162,915, filed on Mar. 24, 2009.

(51) Int. Cl.
- *G08B 1/08* (2006.01)
- *G08G 1/123* (2006.01)
- *B60R 25/10* (2006.01)
- *G06F 19/00* (2011.01)
- *H04W 4/00* (2009.01)

(52) U.S. Cl. .............. 340/539.13; 340/426.15; 340/993; 340/992; 340/686.6; 235/385; 70/2; 70/104; 70/48; 370/328

(58) Field of Classification Search .................. None
See application file for complete search history.

(56) References Cited

U.S. PATENT DOCUMENTS

| | | | |
|---|---|---|---|
| 7,030,731 B2 * | 4/2006 | Lastinger et al. | 340/10.1 |
| 8,284,045 B2 * | 10/2012 | Twitchell, Jr. | 340/539.1 |
| 2002/0024443 A1 | 2/2002 | Hawkins et al. | |
| 2005/0027435 A1 | 2/2005 | Scheppmann | |
| 2006/0012476 A1 | 1/2006 | Markhovsky et al. | |
| 2006/0077041 A1 * | 4/2006 | Chan et al. | 340/10.4 |
| 2007/0119927 A1 | 5/2007 | Wingo et al. | |
| 2007/0152815 A1 * | 7/2007 | Meyers et al. | 340/539.22 |
| 2008/0055158 A1 | 3/2008 | Smith et al. | |
| 2008/0099557 A1 | 5/2008 | James | |
| 2008/0117040 A1 * | 5/2008 | Peel et al. | 340/539.16 |
| 2008/0180252 A1 * | 7/2008 | Vogt | 340/572.4 |

FOREIGN PATENT DOCUMENTS

WO WO 2007/106972 A1 9/2007

OTHER PUBLICATIONS

PCT International Search Report and the Written Opinion mailed Sep. 27, 2010, in related International Application No. PCT/US2010/028399.

* cited by examiner

*Primary Examiner* — Jennifer Mehmood
*Assistant Examiner* — Fekadeselassie Girma
(74) *Attorney, Agent, or Firm* — IP Law Leaders PLLC; Cameron H. Tousi; Christopher P. Rogers

(57) ABSTRACT

A method and apparatus involve a plurality of first devices, and a second device movable relative thereto. According to one aspect, the first and second devices respectively transmit first information and second information containing unique identification codes, the first information also containing position information. The devices collectively include circuitry that estimates distances therebetween, one of the first and second information including the estimate. According to a different aspect, one of the second device and each first device transmits its identification code, and the devices collectively include circuitry that determines two successive sets of estimates representing respective distances between the second device and each first device. One of the second device and each first device transmits information that includes both estimates for that first device, and identification codes for the second device and that first device.

35 Claims, 16 Drawing Sheets

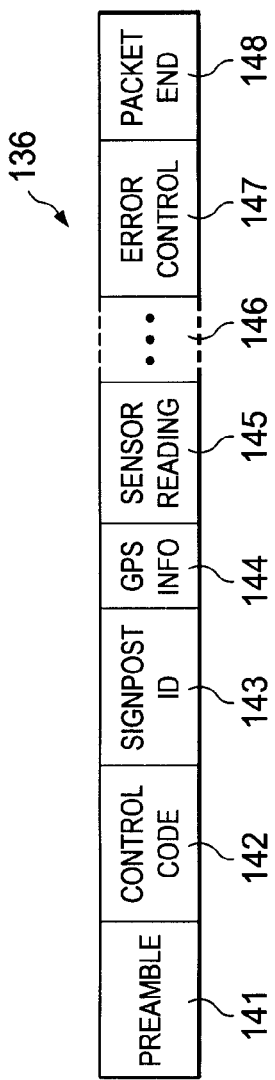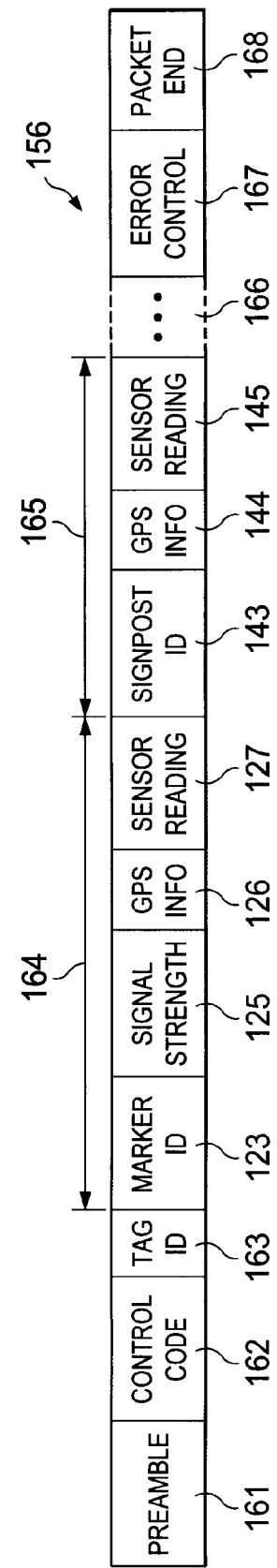

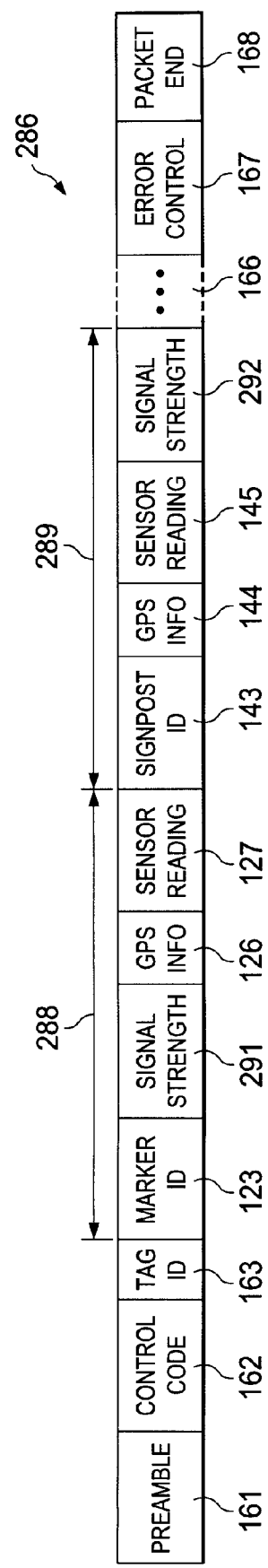

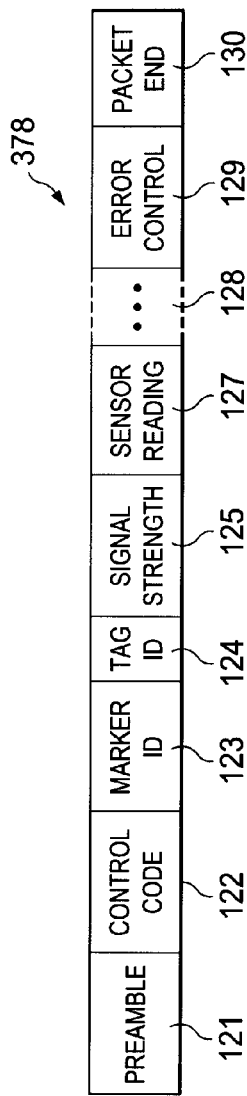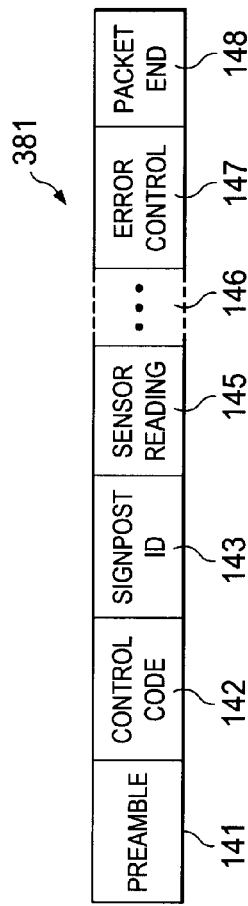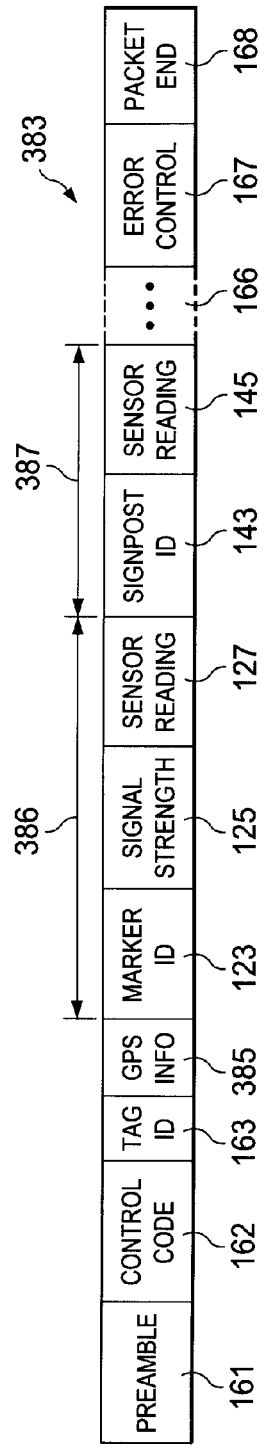

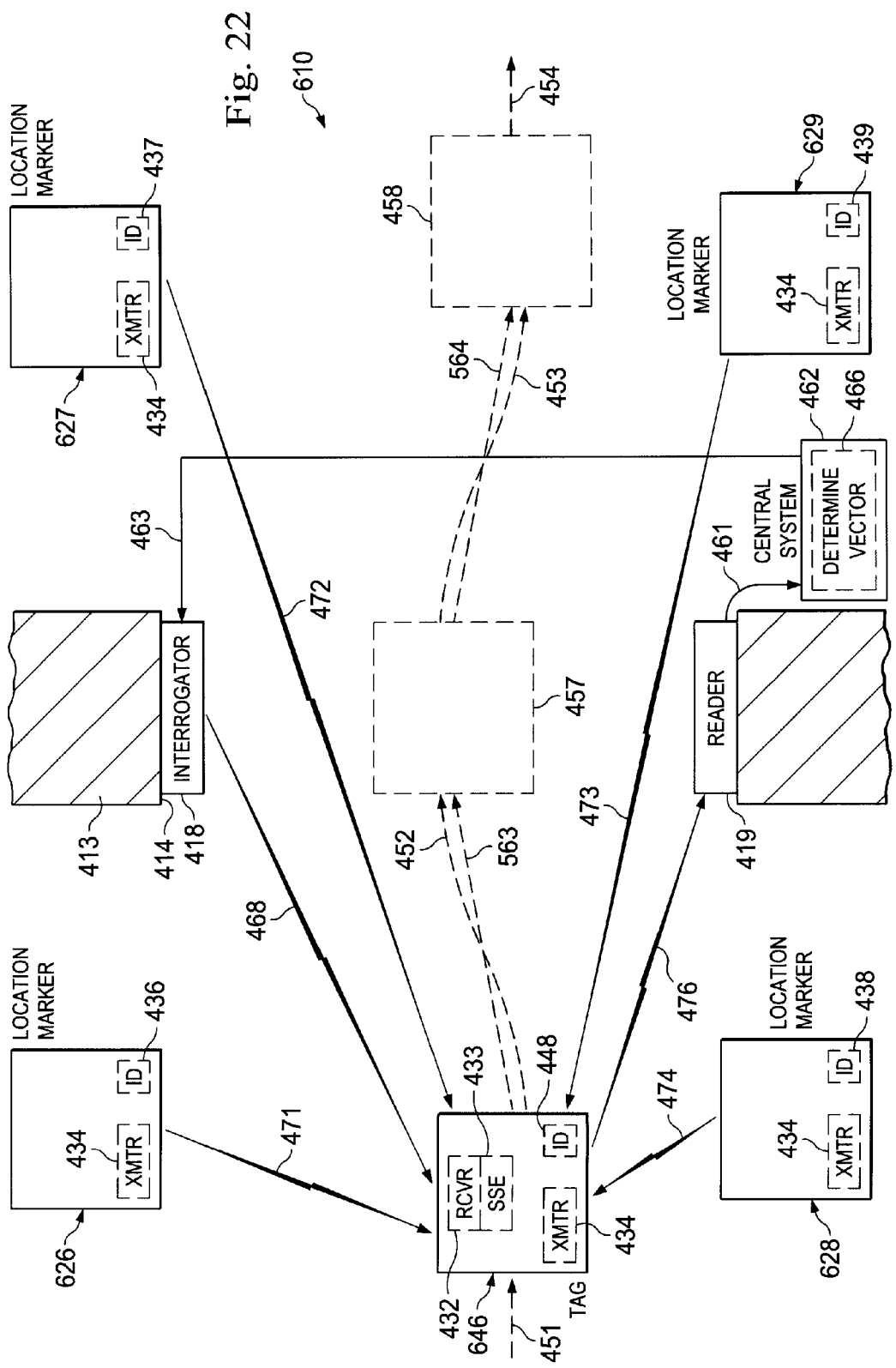

METHOD AND APPARATUS FOR REAL-TIME LOCATION OF ASSETS

This application claims the priority under 35 U.S.C. §119 of provisional application No. 61/162,915 filed Mar. 24, 2009, the disclosure of which is hereby incorporated herein by reference.

FIELD OF THE INVENTION

This invention relates in general to techniques for tracking and monitoring and, more particularly, to real-time location techniques.

BACKGROUND

Radio frequency identification (RFID) systems are used for a variety of different applications. As one example, RFID systems are commonly used to track and monitor shipping containers or other mobile assets. RFID tags are attached to containers or other assets, and can exchange wireless communications with other system components, including interrogators and/or readers. In systems of this type, it can be beneficial to determine in real time the current status of any given tag, including its location, speed and direction of movement. Systems of this type are sometimes referred to as real-time locating systems (RTLS). Although existing techniques for collecting real-time information in RFID systems have been generally adequate for their intended purposes, they have not been entirely satisfactory in all respects.

BRIEF DESCRIPTION OF THE DRAWINGS

A better understanding of the present invention will be realized from the detailed description that follows, taken in conjunction with the accompanying drawings, in which:

FIG. 4 is a diagrammatic view of a digital word present in signpost signals transmitted by the signposts of FIG. 1.

FIG. 5 is a diagrammatic view of a digital word that is present in a tag signal transmitted by the tag of FIG. 1.

FIG. 8 is a diagrammatic view of a digital word present in marker signals transmitted by the location markers of FIG. 7.

FIG. 9 is a diagrammatic view of a digital word present in a tag signal transmitted by the tag of FIG. 7.

FIG. 12 is a diagrammatic view of a digital word present in marker signals transmitted by the location markers of FIG. 11.

FIG. 13 is a diagrammatic view of a digital word present in signpost signals transmitted by the signposts of FIG. 11.

FIG. 14 is a diagrammatic view of a digital word present in a tag signal transmitted by the tag of FIG. 11.

FIG. 22 is a diagrammatic view of an apparatus that is an alternative embodiment of the apparatus of FIG. 16, and that includes location markers, a tag, and an interrogator.

DETAILED DESCRIPTION

Figure 1:
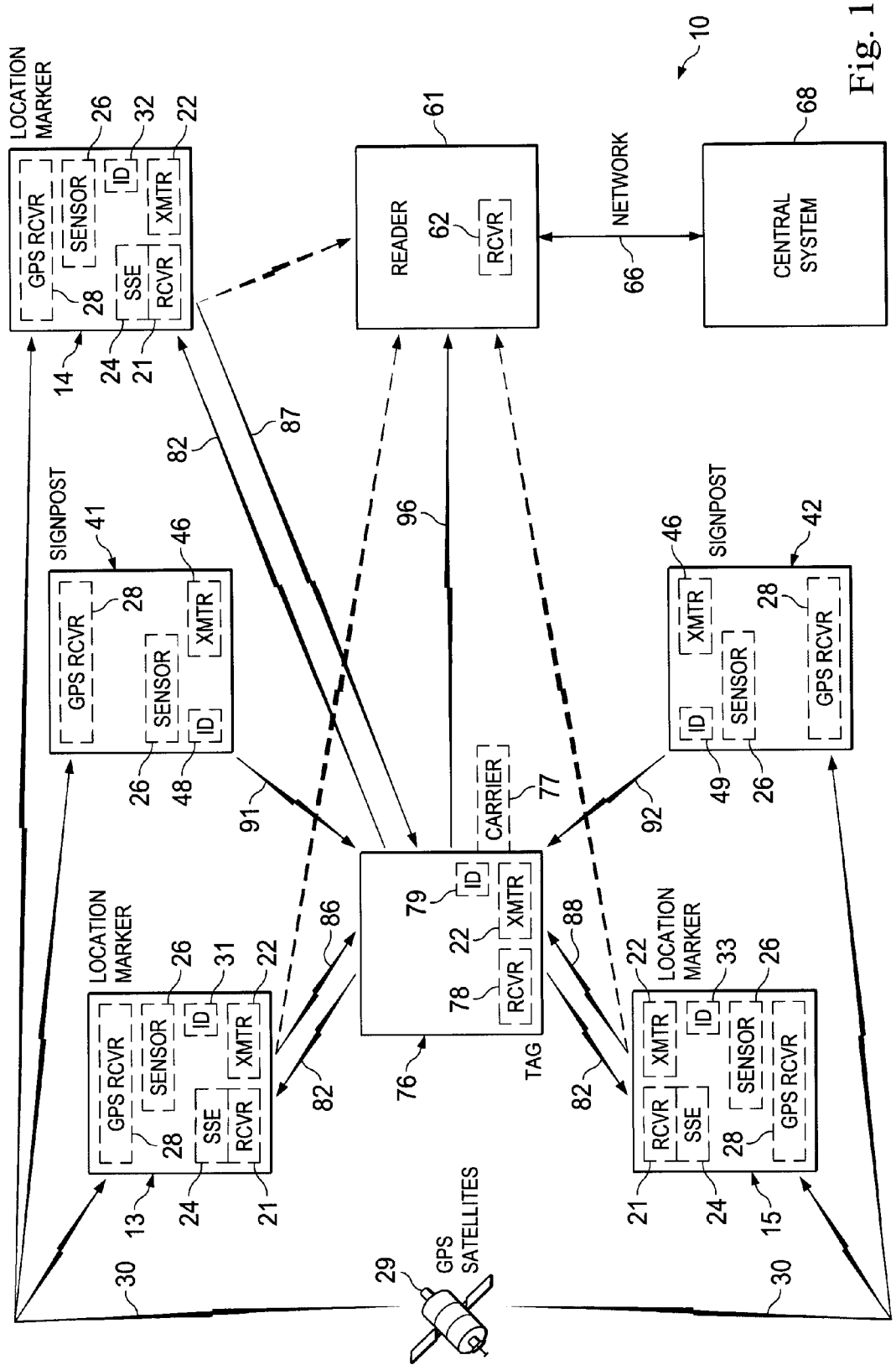
FIG. 1 is a diagrammatic view of an apparatus that is an asset tracking and locating system embodying aspects of the invention, and that includes signposts, location markers, and a tag.

FIG. 1 is a diagrammatic view of an apparatus 10 that is an asset tracking and locating system embodying some aspects of the invention. The apparatus 10 includes three location markers 13, 14 and 15 that are devices stationarily supported at spaced locations. In the disclosed embodiment, the location markers 13-15 are each a radio frequency identification (RFID) tag, but they could alternatively be dedicated devices. Each of the location markers 13-15 includes an ultrahigh frequency (UHF) receiver (RCVR) 21, and a UHF transmitter (XMTR) 22. The receiver 21 and transmitter 22 receive and transmit digital information that is discussed in more detail later, and that is amplitude-modulated onto a carrier using frequency shift keying (FSK), or some other suitable form of modulation. In the disclosed embodiment, the carrier signal has a frequency of 433.92 MHz, but it could alternatively have some other suitable frequency. In the disclosed embodiment, UHF signals transmitted by the transmitter 22 have a range of about 300 feet, but it would alternatively be possible for them to have a different transmission range.

The location markers 13-15 each include a signal strength evaluation (SSE) circuit 24, which evaluates the strength of wireless signals received through the receiver 21. In addition, the location markers 13-15 each include a sensor section 26 having one or more sensors. Each sensor in the sensor section 26 senses one of an ambient temperature, an ambient humidity, an ambient pressure, an ambient moisture level, an ambient level of radiation, an ambient concentration of a selected gas, or some other condition.

The location markers 13-15 each include a global positioning system (GPS) receiver 28 that can receive standard wireless GPS signals 30 transmitted by several conventional GPS satellites that orbit the earth and that are represented diagrammatically at 29 in FIG. 1. The GPS signals from the satellites 29 include standard GPS positioning information that can be used in a known manner to calculate the location of each GPS receiver 28 on the surface of the earth. Each of the location markers 13, 14 and 15 has a unique identification code, and these unique identification codes are represented diagrammatically at 31, 32 and 33 in FIG. 1.

The apparatus 10 includes two signposts 41 and 42 stationarily supported at locations that are spaced from each other, and spaced from each of the location markers 13-15. The signposts 41 and 42 are devices that each include a sensor section 26 and a GPS receiver 28 of the type discussed above. The signposts 41 and 42 each include a low frequency (LF) transmitter 46 of a known type. Each transmitter 46 amplitude-modulates digital information onto a carrier signal using amplitude shift keying (ASK), or some other suitable modulation technique. In the disclosed embodiment, the carrier frequency is 132 KHz, but it could alternatively be any other suitable frequency. LF signals transmitted by the transmitter 46 are near field signals of primarily magnetic character, and thus have a relatively short transmission range. In the disclosed embodiment, the transmission range is approximately twelve feet, but it would alternatively be possible for the LF signals to have some other transmission range. Each of the signposts 41 and 42 has a unique identification code, and in FIG. 1 these codes are shown diagrammatically at 48 and 49.

A reader 61 of a known type is stationarily supported at a location that is spaced from each of the location markers 13-15 and each of the signposts 41-42. The reader 61 is a device that includes a UHF receiver 62 of a known type. The reader 61 is coupled through a computer network 66 to a central system 68. The network 66 can be implemented with cables, and/or can include one or more wireless links.

The apparatus 10 includes an RFID tag 76 that is mounted on a mobile carrier 77. The carrier 77 may, for example, be a shipping container, a pallet, or some other type of movable object. The tag 76 moves with the carrier 77, and thus moves relative to the location markers 13-15, the signposts 41-42 and the reader 61. The tag 76 is a device that includes a transmitter 22 of the same type used in the location markers 13-15. The tag 76 has a receiver 78 that can receive UHF signals of the type transmitted by the transmitters 22 in the location markers 13-15, and that can also receive LF signals of the type transmitted by the signposts 41-42. The tag 76 has a unique identification code that is depicted diagrammatically at 79 in FIG. 1.

In operation, the tag 76 transmits a wireless interrogation signal 82 to the location markers 13-15. The location markers 13-15 then send back respective wireless marker signals 86, 87 and 88. The signposts 41 and 42 periodically transmit wireless signpost signals 91 and 92, which are also received by tag 76. The tag 76 transmits to the reader 61 a wireless tag signal 96 containing information extracted from the marker signals 86-88 and from the signpost signals 91-92. The digital information in the wireless signals 82, 86-88, 91-92 and 96 is described in more detail below.

Figure 2:
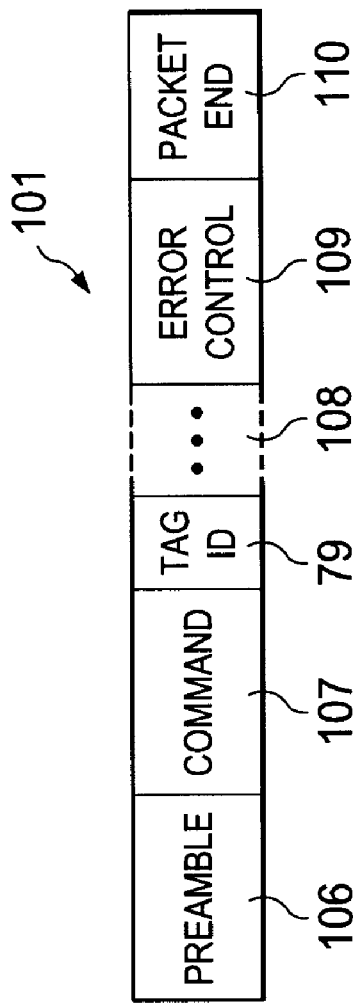
FIG. 2 is a diagrammatic view of a digital word present in an interrogation signal transmitted by the tag of FIG. 1.

More specifically, FIG. 2 is a diagrammatic view of a digital word 101 that is present in the interrogation signal 82 transmitted by the tag 76. The bits of the digital word 101 are transmitted by serially modulating them onto the carrier signal, from left to right in FIG. 2. The digital word 101 has several different fields of information. The first field is a preamble 106, which is a predefined pattern of bits that allows a device receiving the signal to recognize the digital word 101 is beginning, and to synchronize itself to the incoming digital word.

The next field 107 in the digital word 101 is a command 107, which instructs the location markers 13-15 to send back the marker signals 86-88. The next field contains the tag identification code 79. The digital word 101 may optionally have one or more additional fields 108, which are not relevant to the present discussion and are therefore not illustrated and described in detail.

The next field in the digital word 101 is an error control field 109. Wireless communications between the various devices shown in FIG. 1 are essentially one-way transmissions, and the apparatus 10 may be utilized in environments that involve relatively high noise levels. Consequently, it is important for a receiving device to be able to evaluate whether a word 101 that it received is correct or has errors. The error control field 109 is therefore provided to offer a degree of forward error correction (FEC). In the disclosed embodiment, the error control field 109 contains several parity bits, but it would alternatively be possible to use some other technique for error control. The last field in the word 101 is a packet end field 110. This field signals to a receiving device that the incoming digital word 101 is ending. The packet end field 110 may, for example, contain several bits that are all set to a binary zero.

Figure 3:
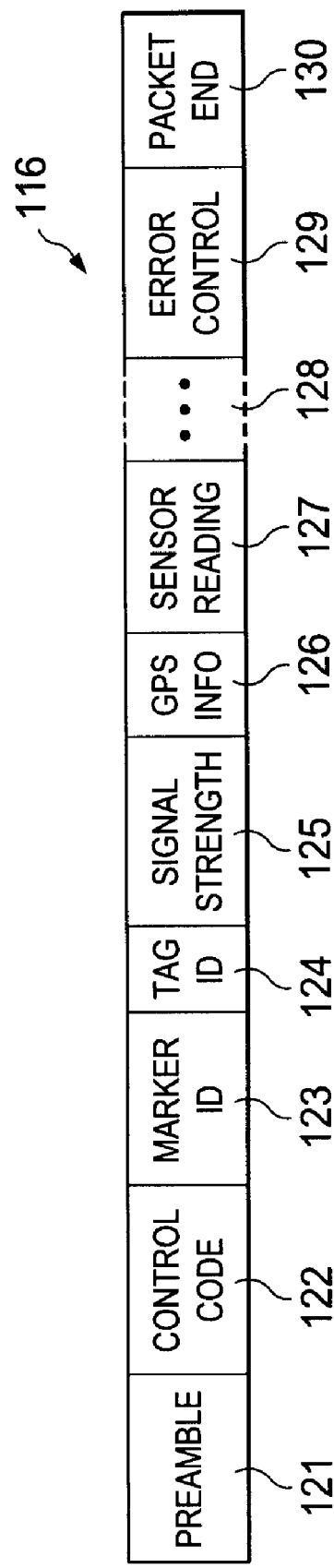
FIG. 3 is a diagrammatic view of a digital word present in marker signals transmitted by the location markers of FIG. 1.

FIG. 3 is a diagrammatic view of a further digital word 116 that is present in the marker signals 86-88 transmitted by the location markers 13-15. The digital word 116 begins with a preamble 121, which is followed by a control code 122. The control code 122 identifies for a receiving device the purpose and format of the digital word 116. The next field 123 contains a marker identification code, which is one of the unique identification codes 31-33 (FIG. 1), identifying which of the location markers 13-15 transmitted this particular digital word 116.

The next field 124 contains the unique identification code 79 of the tag 76, which is extracted from the digital word 101 received by that location marker. When the tag 76 receives a wireless signal containing the digital word 116, the field 124 tells the tag 76 whether that transmission is intended for it, or for some other nearby tag. In each of the location markers 13-15, when the receiver 21 receives the interrogation signal 82 from the tag 76, the SSE circuit 24 evaluates the strength of that received signal. The result of this evaluation is an estimate of the distance between the tag 76 and that particular location marker. The next field 125 in the digital word 116 contains this signal strength value 125. In effect, the SSE circuits 24 in the location markers 13-15 collectively serve as ranging circuitry that determines distances between the tag 76 and each of the location markers.

The next field 126 in the digital word 116 contains GPS position information, which is the positioning information received by that location marker in the GPS signals 30 from the GPS satellites 29. The next field 127 contains a sensor reading from the sensor 26 in the location marker that is transmitting the word 116. For example, if the sensor 26 is a temperature sensor, field 127 will contain a value representing a temperature recently read from the temperature sensor.

The digital word 116 may optionally contain other fields 128 that are not relevant to the present discussion and that are therefore not illustrated and described in detail. The digital word 116 ends with an error control field 129 and a packet end field 130 that are equivalent to the fields 109 and 110 in the digital word 101. The tag 76 receives a respective digital word 116 from each of the location markers 13-15.

As discussed above, the signposts 41 and 42 each periodically transmit the signpost signals 91 and 92. FIG. 4 is a diagrammatic view of a digital word 136 that is present in each signpost signal. The fields in the digital word 136 include a preamble 141 followed by a control code 142. The control code 142 identifies for a receiving device the purpose and format of the digital word 136. The next field 143 contains a signpost identification code, which is the identification code 48 or 49 of the particular signpost that is transmitting the digital word 136. The next field 144 contains GPS position information, which is the positioning information from the GPS signals 30 received by that signpost through its GPS receiver 28. The next field 145 contains a sensor reading from the sensor 26 in the signpost that is transmitting the word 136. The word 136 may optionally contain other fields 146 that are not illustrated and described here, and ends with an error control field 147 and packet end field 148 that are equivalent to the fields 109 and 110 in the digital word 101.

After receiving three marker signals 86-88 from the location markers 13-15, and two signpost signals 91-92 from the signposts 41-42, the tag 76 prepares and transmits the tag signal 96. In this regard, FIG. 5 is a diagrammatic view of a digital word 156 that is contained in the tag signal 96. The digital word 156 begins with a preamble 161, followed by a control code 162. The control code 162 identifies for a receiving device the purpose and format of the digital word 156. The next field 163 contains the unique identification code 79 of the tag 76. Next, there is a field group 164 having four fields that are identically the fields 123, 125, 126, and 127 that the tag received in the digital word 116 from one of the location markers 13-15. The field group 164 is followed by another field group 165 having three fields that are identically the fields 143, 144 and 145 that the tag received in the digital word 136 from one of the signposts 41-42.

The digital word 156 includes other fields at 166. In this regard, the field group 164 contains information from only one of the location markers 13-15, and section 166 of the digital word 156 includes two other similar field groups for the other two location markers. Similarly, the field group 165 contains information from only one of the signposts 41-42, and section 166 of the digital word 156 includes another similar field group for the other signpost. For simplicity and clarity, this discussion assumes that the field groups for all of the location markers and all of the signposts are included in the single digital word 156. However, as a practical matter, if there are a significant number of location markers and/or a significant number of signposts in the vicinity of the tag 76, then the tag may need to split the data up into segments and send each segment in a separate wireless signal 96. The digital word 156 ends with an error control field 167 and a packet end field 168, which are equivalent to the fields 109 and 110 in the digital word 101.

Figure 6:
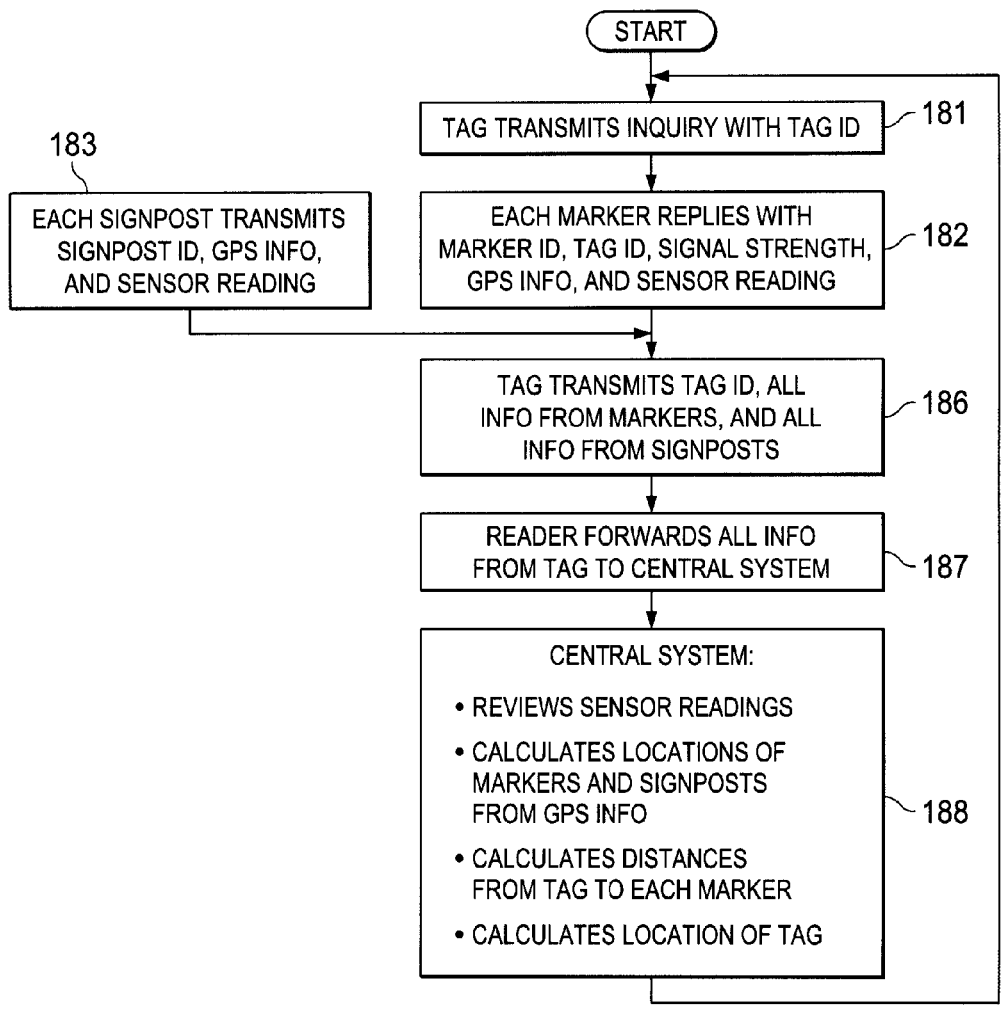
FIG. 6 is a flowchart providing a high-level summary of a sequence of events that occurs during operation of the apparatus of FIG. 1.

FIG. 6 is a flowchart providing a high-level summary of a sequence of events that occurs during operation of the apparatus 10 of FIG. 1. In block 181, the tag 76 transmits to each of the location markers 13-15 the interrogation signal 82 containing the digital word 101, including the tag identification code 79. At block 182, each of the location markers transmits back its respective marker signal 86, 87 or 88, containing the digital word 116 with a respective marker identification code 31-33, the tag identification code 79, the signal strength of the interrogation signal 82 as measured by that marker's SSE circuit 24, GPS information extracted from received GPS signals 30, and a sensor reading from the sensor 26 in that location marker.

Meanwhile, with reference to block 183, the signposts 41 and 42 are each periodically transmitting their signpost signals 91 and 92 containing the digital word 163. Thus, each signpost signal contains the signpost identification code 48 or 49 of that signpost, GPS information extracted from GPS signals 30 received by that signpost, and a sensor reading from the sensor 26 in that signpost.

With reference to block 186, the tag prepares the digital word 156 (FIG. 5) containing its identification code 79, and containing information received by the tag from each of the location markers and each of the signposts. The tag then transmits to the reader 61 the tag signal 96 containing this digital word 156.

With reference to block 187, the reader 61 extracts all of the relevant information contained within the digital word 156, and forwards this information to the central system 68. With reference to block 188, the central system 68 reviews any sensor readings that may be present. For example, if the tag is on a container packed with fresh fruit, and if the central system 68 receives sensor readings indicating an unusually high ambient temperature, the central system 68 may elect to take corrective action.

Still referring to block 188, the central system uses the GPS information received from each of the location markers and signposts to calculate the precise location of each location marker and each signpost. Next, the central system uses the signal strength information from the location markers to calculate the respective distances from the tag 76 to each of the location markers 13-15. Then, the central system calculates a very accurate location for the tag 76, based on the accurate locations determined for the location markers and signposts with the GPS information, and based on triangulation using the various distances calculated from the signal strength information.

An additional benefit of providing GPS capability in the location markers and the signposts is that the location markers and signposts can be installed and then automatically provide the central system 68 with accurate information about their location, without the need for a person to manually advise the system of the locations of these devices.

In a variation of the embodiment of FIG. 1, the reader 61 could directly receive each of the marker signals 86, 87 and 88, as indicated diagrammatically by broken lines in FIG. 1. In other words, the reader would directly receive from each of the location markers 13-15 the digital word 116 and all of the information therein. This would avoid the overhead and delay involved in routing this information through the tag 76, thereby increasing the speed and efficiency with which the reader 61 receives information from each of the location markers 13-15, which can be beneficial in a real-time locating system. In this alternative approach, the field groups 164 corresponding to the location markers 13-15 would be omitted from the digital word 156 (FIG. 5) that is transmitted by the tag 76, because the reader 61 will already be receiving this same information directly from the location markers.

In one practical application of the apparatus 10 of FIG. 1, the location markers 13-15 are provided at spaced location along a railroad track, and the tag 76 and reader 61 are provided on a train movable along the track. The link 66 between the reader and the central system 68 includes a long-distance wireless link. For example the link 66 may utilize a cellular telephone network communication protocol such as the General Packet Radio Service (GPRS) communication protocol.

Figure 7:
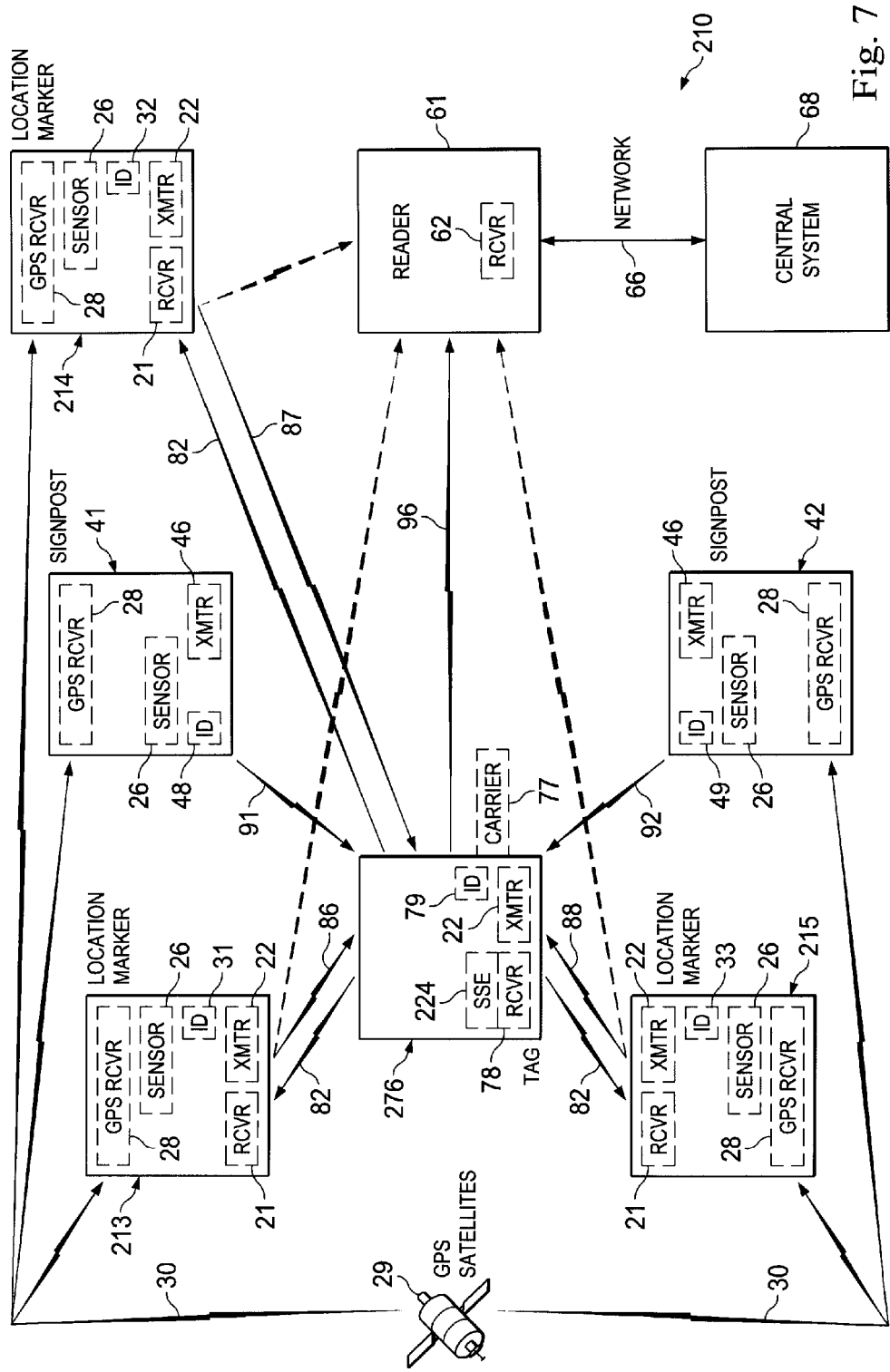
FIG. 7 is a diagrammatic view of an apparatus that is an alternative embodiment of the apparatus of FIG. 1, and that includes signposts, location markers and a tag.

FIG. 7 is a diagrammatic view of an apparatus 210 that is an alternative embodiment of the apparatus 10 of FIG. 1. Similar and identical parts are identified with the same reference numerals in each of FIGS. 1 and 7. The following discussion focuses primarily on the differences.

In FIG. 7, the location markers 13-15 of FIG. 1 have been replaced with location marker 213-215. The location markers 213-215 are similar to the location markers 13-15, except that the location markers 213-215 do not include the signal strength evaluation circuits 24. In addition, the tag 76 of FIG.

1 has been replaced with a tag 276. The tag 276 is similar to the tag 76, except that the tag 276 has a signal strength evaluation circuit 224.

In operation, the tag 276 transmits the interrogation signal 82, which contains the digital word 101 of FIG. 2. In reply, the location markers 213-215 send back the respective marker signals 86-88, but the digital word in the marker signals 86-88 is different from that shown in FIG. 3. More specifically, FIG. 8 is a diagrammatic view of a digital word 281 that is present in each of the marker signals 86-88 in the apparatus 210 of FIG. 7. The digital word 281 is similar to and has the same fields as the digital word 116 of FIG. 3, except that the signal strength field 125 is omitted from the digital word 281.

In the apparatus 210 of FIG. 7, the information in the tag signal 96 is also slightly different. FIG. 9 is a diagrammatic view of a digital word 286 that is present in the tag signal 96 transmitted from the tag 276 to the reader 61. There are two differences between the digital word 286 of FIG. 9 and the digital word 156 of FIG. 5. First, the digital word 286 includes a field group 288 that is similar to the field group 164, except the signal strength value 125 in the field group 164 is replaced with a signal strength value 291 in the field group 288. These signal strengths differ in that the signal strength 125 is the strength of the interrogation signal 82 as received by a location marker, whereas the signal strength 291 is the strength of a respective marker signal 86, 87 or 88 as determined by the evaluation circuit 224 in the tag 276. The second difference is that the field group 289 includes a signal strength field 292 that was not present in the field group 165 of FIG. 5. The signal strength 292 is the strength of a received signpost signal 91 or 92 as determined by the evaluation circuit 224 in the tag 276.

Figure 10:
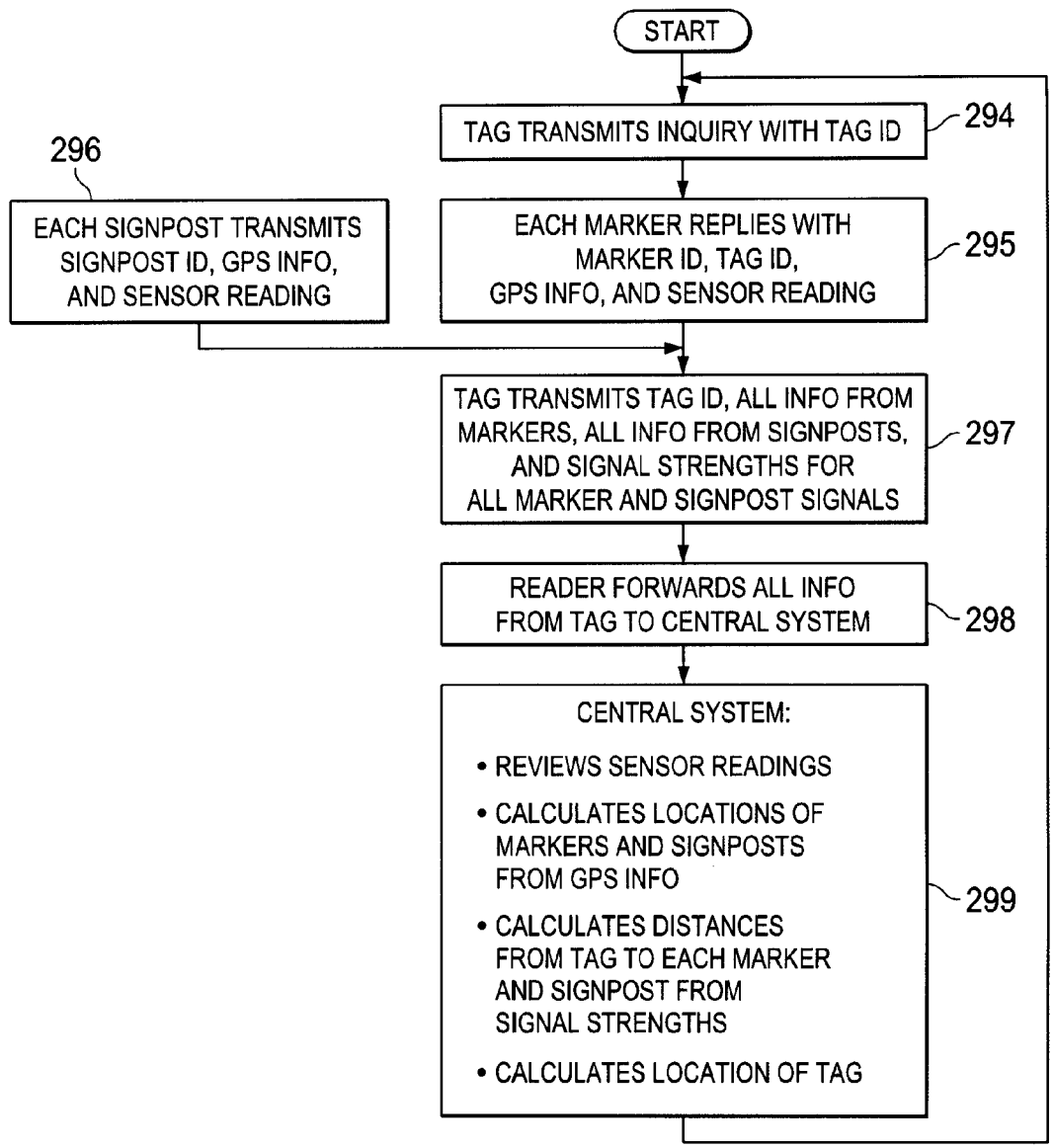
FIG. 10 is a flowchart providing a high-level summary of a sequence of events that occurs during operation of the apparatus of FIG. 7.

FIG. 10 is a flowchart providing a high-level summary of a sequence of events that occurs during operation of the apparatus 210 of FIG. 7. In the flowchart of FIG. 7, block 294 is equivalent to block 181 of FIG. 6, in that the tag 276 transmits the interrogation signal 82. In block 295, each location marker 213-215 transmits its respective marker signal 86-88 back to the tag. This is similar to block 182 in FIG. 6, except that the marker signals do not include any signal strength values. Block 296 is equivalent to block 183 of FIG. 6, in that each signpost transmits its respective signpost signal 91 or 92.

Block 297 in FIG. 10 in similar to block 186 in FIG. 6, except that the signal strength information forwarded to the reader in the tag signal 96 is signal strength information determined within the tag 276, rather than signal strength information from the location markers. Block 298 in FIG. 10 is equivalent to block 187 in FIG. 6, in that the reader forwards all of the information it receives to the central system 68. Block 299 is similar to block 188, except that the central system can use signal strength information to calculate not only distances from the tag 276 to each of the location markers 213-215, but also distances from the tag 276 to each of the signposts 41 and 42.

In a variation of the operation of the apparatus 210 of FIG. 7, the reader 61 would receive each of the marker signals 86-88 directly from the location markers 213-215, as indicated diagrammatically by broken lines in FIG. 7. In this alternative approach, the field groups 288 (FIG. 9) could be omitted from the digital word 286.

Figure 11:
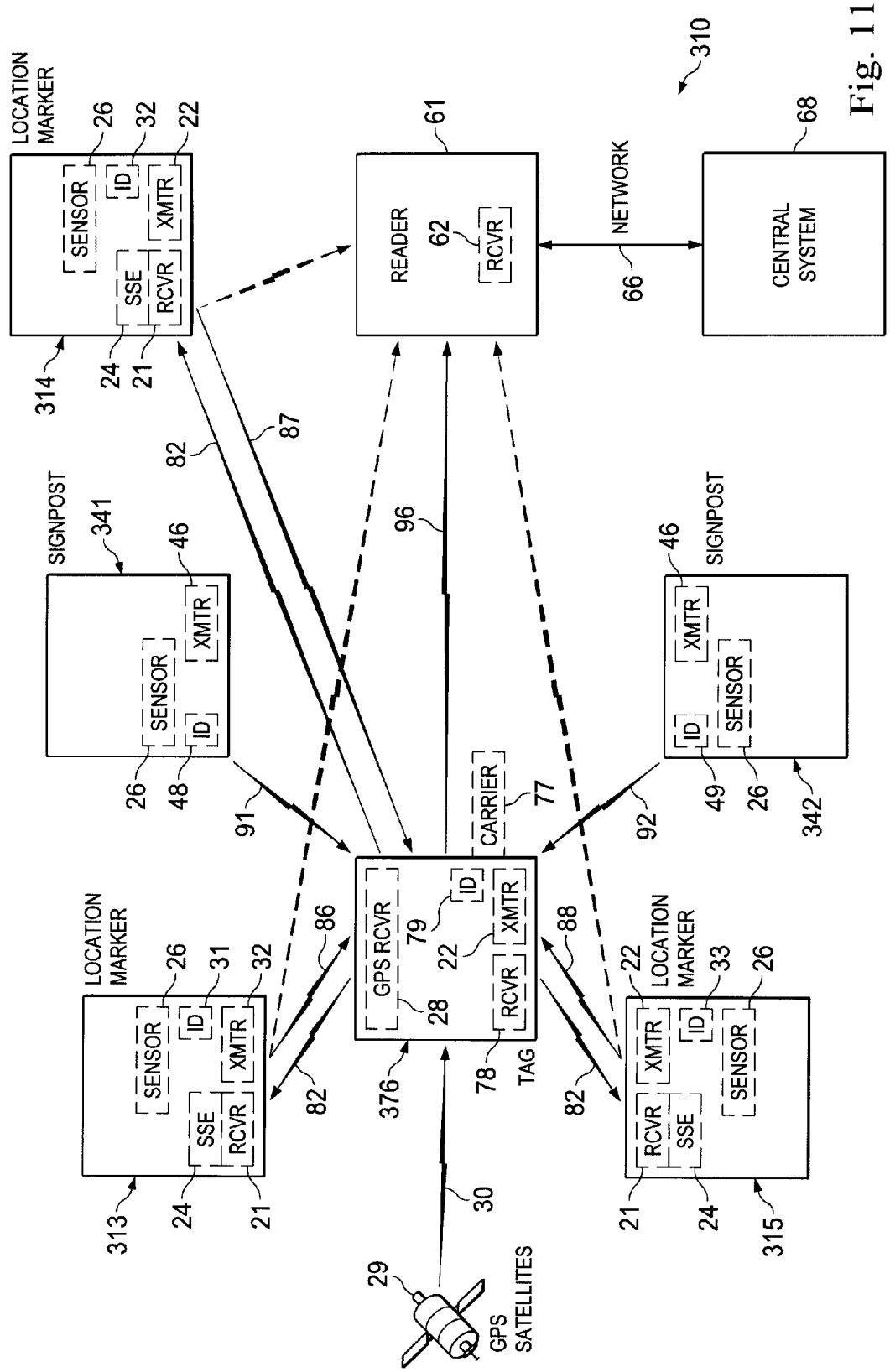
FIG. 11 is a diagrammatic view of an apparatus that is yet another alternative embodiment of the apparatus of FIG. 1, and that includes signposts, location markers and a tag.

FIG. 11 is a diagrammatic view of an apparatus 310 that is yet another alternative embodiment of the apparatus 10 of FIG. 1. Similar and identical parts are identified by the same reference numerals, and the following discussion focuses primarily on the differences.

In the apparatus 310 of FIG. 11, the location markers 13-15 in the apparatus 10 of FIG. 1 have been replaced with location markers 313-315. The location markers 313-315 are identical to the location markers 13-15, except that the location markers 313-315 do not include the GPS receiver 28. In addition, in FIG. 11, the signposts 41 and 42 in the apparatus 10 of FIG. 1 have been replaced with signposts 341 and 342. The signposts 341 and 342 are identical to the signposts 41 and 42, except that the signposts 341 and 342 do not include the GPS receiver 28. Further, the tag 76 in the apparatus 10 of FIG. 1 has been replaced with a tag 376. The tag 376 is equivalent to the tag 76, except that the tag 376 includes a GPS receiver 28 that receives the GPS signals 30 from GPS satellites 29. The carrier 77 on which the tag 376 is supported could be an asset such as a container, but could also be a mobile robot that follows predefined paths within the region serviced by the apparatus 310, or that roams somewhat randomly around this region.

In operation, the tag 376 transmits the interrogation signal 82, which contains identically the same digital word 101 that is shown in FIG. 2. The location markers 313-315 then transmit their respective marker signals 86-88. FIG. 12 is a diagrammatic view of a digital word 378 that is used in the marker signals 86-88. The digital word 378 is equivalent to the digital word 116 shown in FIG. 3, except that the digital word 378 does not include the field 126 containing GPS information.

Meanwhile, the signposts 341 and 342 are periodically transmitting their signpost signals 91 and 92. FIG. 13 is a diagrammatic view of a digital word 381 that is present in the signpost signals 91 and 92 transmitted by signposts 341 and 342. The digital word 381 of FIG. 13 is equivalent to the digital word 136 shown in FIG. 4, except that the digital word 381 does not include the field 144 containing GPS information.

The tag 376 then transmits its tag signal 96 to the reader 61. FIG. 14 is a diagrammatic view of a digital word 383 that is present in the tag signal 96. The digital word 383 is equivalent to the digital word 156 shown in FIG. 5, except for the following differences. The digital word 383 includes a field 385 containing GPS information from the GPS receiver 28 in the tag 376. This is positioning information extracted from GPS signals 30 received by the tag 376. The digital word 383 also includes a field group 386, which is similar to the field group 164 in FIG. 5, except that field group 386 does not include the field 126 containing GPS information. The digital word 383 also includes a field group 387, which is similar to the field group 165 in FIG. 5, except that it does not include the field 144 containing GPS information.

Figure 15:
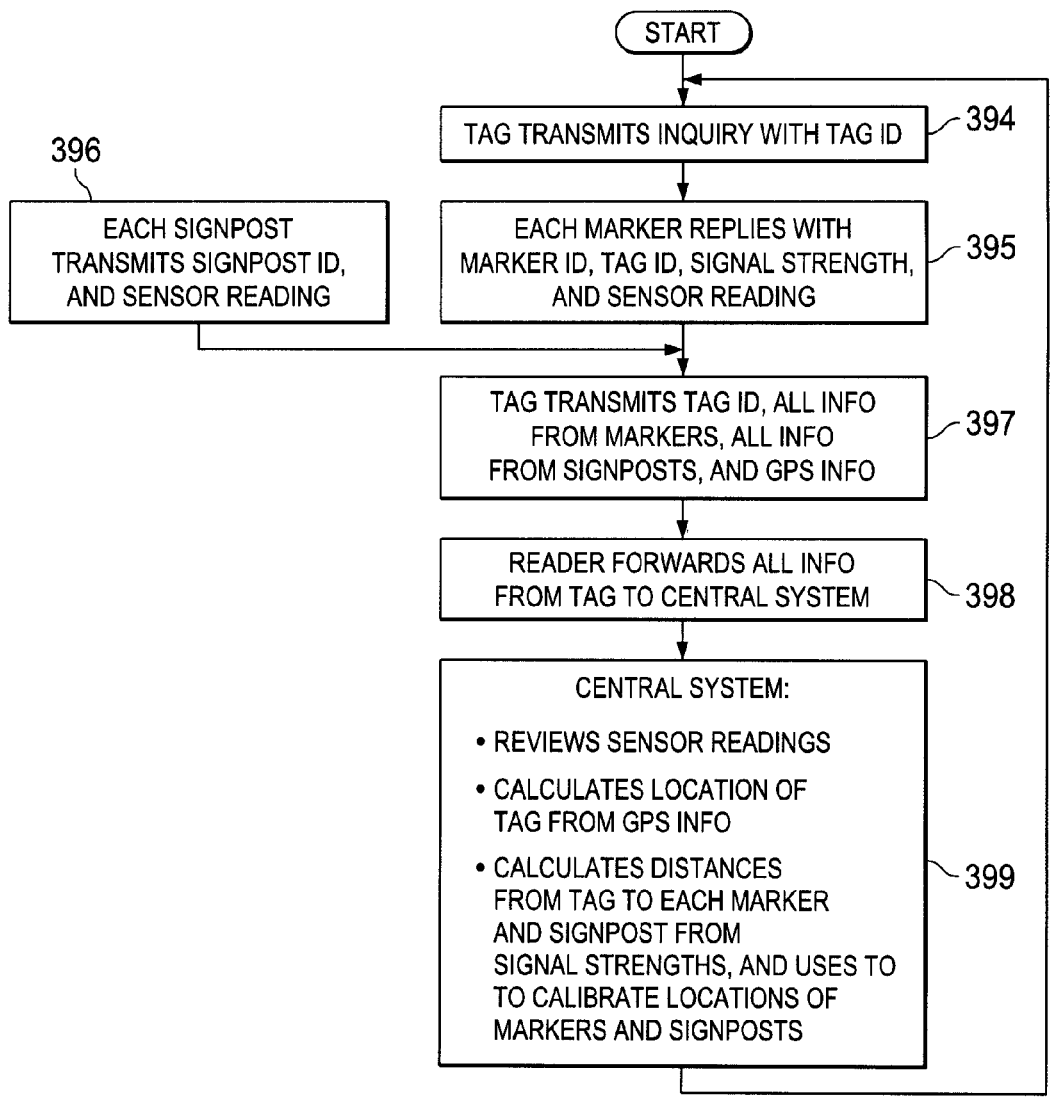
FIG. 15 is a flowchart providing a high-level summary of a sequence of events that occurs during operation of the apparatus of FIG. 11.

FIG. 15 is a flowchart providing a high-level summary of a sequence of events that occurs during operation of the apparatus 310 of FIG. 11. In the flowchart of FIG. 15, block 394 is generally equivalent to block 181 in FIG. 6, in that the tag 276 transmits the interrogation signal 82. In block 395, the location markers 313-315 each transmit a respective marker signal 86-88, containing a respective digital word 378 (FIG. 12). In the apparatus 310 of FIG. 11, the marker signals 86-88 do not include any GPS information. In block 396, the signposts transmit their periodic signpost signals 91 and 92, containing the digital word 381 of FIG. 13. These signpost signals do not include any GPS information.

In block 397, the tag prepares the digital word 383 shown in FIG. 14, and transmits it to the reader 61. The primary difference from the embodiment of FIG. 1 is that the GPS information 385 in the digital word 383 is generated within the tag 376, rather than within the location markers 313-315 or signposts 341-342. Block 398 in FIG. 15 is generally equivalent to block 187 in FIG. 6, in that the reader 61 takes all of the information it has received from the tag 376, and forwards it to the central system 68. Block 399 in FIG. 15 is generally similar to block 188 in FIG. 6, except that the GPS information is used to calculate the location of the tag 376, rather than to calculate the locations of markers and signposts. In addition, rather than using the received signal strength information to calculate the location of the tag, the signal strength information is used to calibrate locally-maintained information that identifies the locations of the markers and signposts.

In a variation of the operation of the apparatus 310 of FIG. 11, the reader 61 can directly receive the marker signals transmitted by the location markers 313-315, as indicated diagrammatically by broken lines in FIG. 11. This avoids the overhead and delay involved in routing this information through the tag 376. Under this approach, the field groups 386 for each of the location markers are omitted from the digital word 383 shown in FIG. 14.

Figure 16:
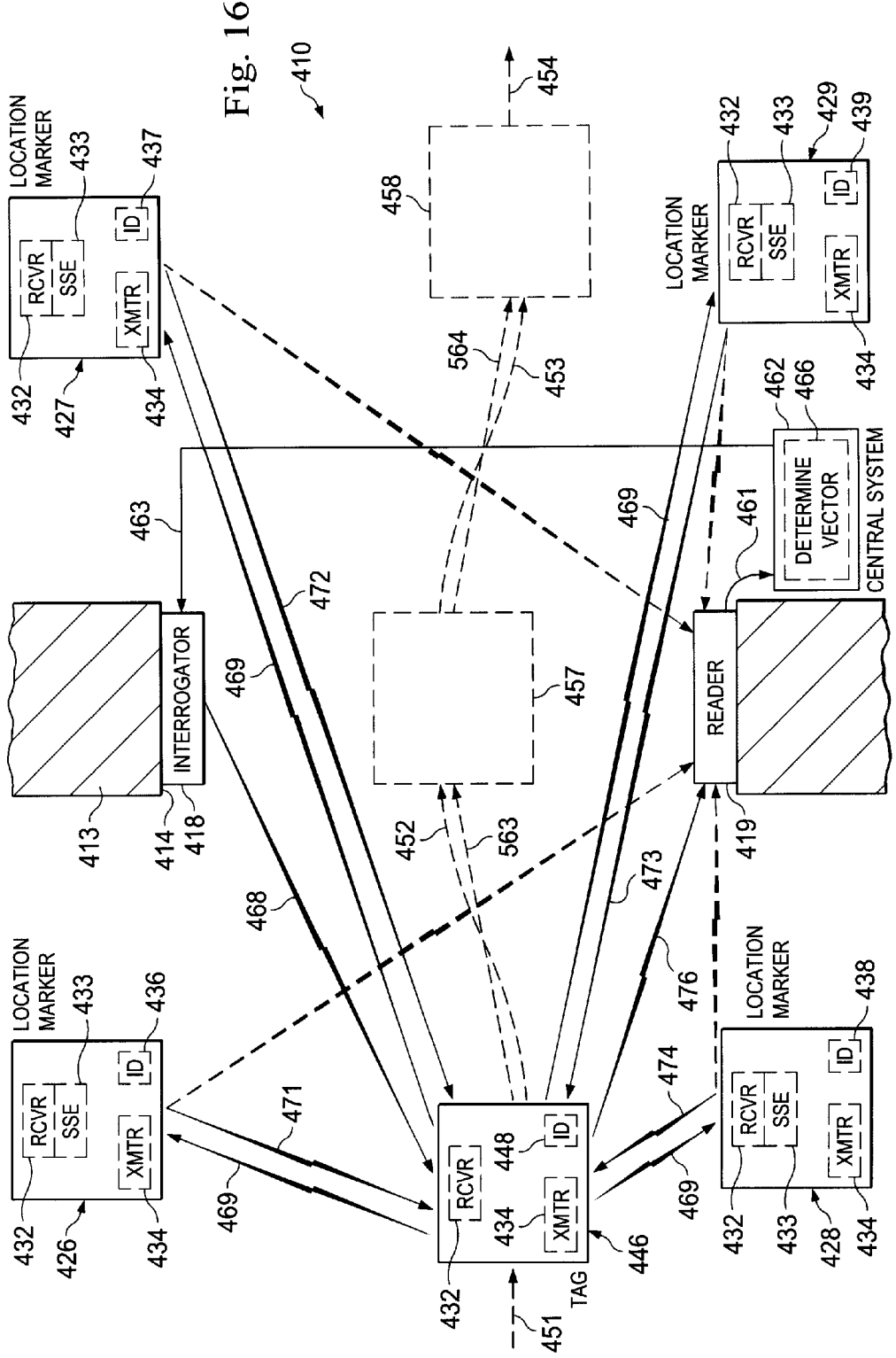
FIG. 16 is a diagrammatic view of an apparatus that is still another alternative embodiment of the apparatus of FIG. 1, and that includes location markers, a tag, and an interrogator.

FIG. 16 is a diagrammatic view of an apparatus 410 that is still another alternative embodiment of the apparatus 10 of FIG. 1. In FIG. 16, a building has a wall 413 with a doorway 414 therethrough. The doorway 414 is one form of "chokepoint" through which tags must pass. An interrogator 418 of a known type is stationarily mounted on one side of the doorway, and a reader 419 of a known type is stationarily mounted on the other side of the doorway. It would alternatively be possible to provide a single device that includes the circuitry of both the interrogator 418 and the reader 419.

Four location markers 426, 427, 428 and 429 are stationarily supported at spaced locations in the region of the doorway 414. The location markers 426-429 are generally identical to each other. They each include a UHF receiver 432 that is similar to the receiver 21 in FIG. 1, a signal strength evaluation circuit 433 that is similar to the circuit 24 in FIG. 1, and a UHF transmitter 434 that is similar to the transmitter 22 in FIG. 1. In addition, the location markers 426-429 have respective unique identification codes that are indicated diagrammatically at 436, 437, 438 and 439.

An RFID tag 446 includes a receiver 432 that can receive UHF signals and LF signals of the type discussed earlier. The tag 446 has a unique identification code that is indicated diagrammatically at 448. The tag 446 is mounted on a not-illustrated mobile asset that is moving along a path of travel identified by successive arrows 451-454. As the tag 446 moves with the asset, there will be successive points in time when the tag is in the location shown in solid lines in FIG. 16, then later in a location 457, and still later in a location 458.

The reader 419 is coupled at 461 to a central system 462, and the central system is coupled at 463 to the interrogator 418. In the disclosed embodiment, the links 461 and 463 from the central system 462 to the reader 419 and interrogator 418 are implemented with physical cables that are part of a computer network. However, it would alternatively be possible to couple the central system to the reader and interrogator in some other suitable manner, possibly including the use of one or more wireless links. The central system 462 includes a section 466 that can determine current status of the tag 446, including location, speed and direction of movement, as discussed in more detail later.

In operation, the interrogator 418 periodically transmits a wireless initiation signal 468, which is sometimes alternatively referred to as an interrogation signal. For purposes of the present discussion, it is assumed that three successive transmissions of the initiation signal 468 respectively occur when the tag 446 is successively in the locations shown in solid lines, at 457, and at 458. In response to each receipt of the initiation signal 468, the tag 446 transmits a wireless interrogation signal 469, which is received by each of the location markers 426-429. Each of the location markers 426-429 then returns a respective wireless marker signal 471, 472, 473 or 474. The tag 446 extracts information from each of these marker signals, and transmits it to the reader 419 in a wireless tag signal 476.

Figure 17:
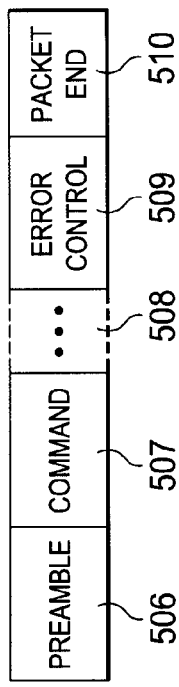
FIG. 17 is a diagrammatic view of a digital word present in an initiation signal transmitted by the interrogator of FIG. 16.

FIG. 17 is a diagrammatic view of a digital word 501 that is present in the initiation signal 468 transmitted by the interrogator 418. The digital word 501 begins with a preamble 506, followed by a field 507 containing a command for any tags that are within range, including the tag 446. The digital word 501 can optionally include other fields 508 that are not relevant to the present discussion, and that are therefore not illustrated and described here in detail. The digital word 501 ends with an error control field 509 and a packet end field 510.

Figure 18:
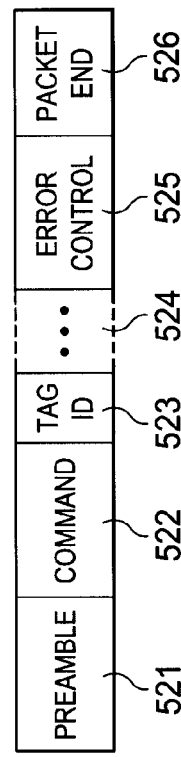
FIG. 18 is a diagrammatic view of a digital word present in an interrogation signal transmitted by the tag of FIG. 16.

FIG. 18 is a diagrammatic view of a digital word 518 that is present in the interrogation signal 469 transmitted by the tag 446. The digital word 518 begins with a preamble 521, followed by a field 522 containing a command for the location markers 426-429. The digital word 518 contains a tag identification field 523, which contains the unique identification code 448 of the tag 446. The digital word 518 may optionally contain other fields 524 that are not relevant to the present discussion, and that are therefore not illustrated and described in detail. The digital word 518 ends with an error control field 525, and a packet end field 526.

Figure 19:
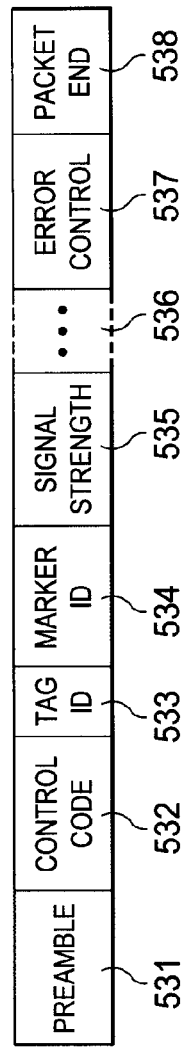
FIG. 19 is a diagrammatic view of a digital word present in marker signals transmitted by the location markers of FIG. 16.

In response to receipt of the interrogation signal 469, each of the location markers 426-429 transmits a respective one of the marker signals 471-474. FIG. 19 is a diagrammatic view of a digital word 529 that is present in each of the marker signals 471-474. The digital word 529 begins with a preamble 531, followed by a field 532 containing a control code that identifies the format and purpose of the digital word 529. The next field 533 contains the unique identification code 448 of the tag 446, which the marker obtains from field 523 in a received digital word 518 (FIG. 18). This ensures that, if multiple tags are present in the region shown in FIG. 16, the tag 446 will ignore received marker signals in which the field 533 contains the identification code of some other tag to indicate the signal is intended for a tag other than the tag 446. The next field 534 in the digital word 529 contains the unique identification code 436, 437, 438 or 439 of the particular location marker that transmitted this signal.

Each of the location markers 426-429 uses the evaluation circuit 433 therein to measure the strength of the tag's interrogation signal 469, as received at that particular location marker. The next field 535 in the digital word 529 contains this measured signal strength value. The digital word 529 can include other fields 536 that are not relevant to this discussion, and that are therefore are not illustrated and described in detail. The digital word 529 ends with an error control field 537, and a packet end field 538.

Figure 20:
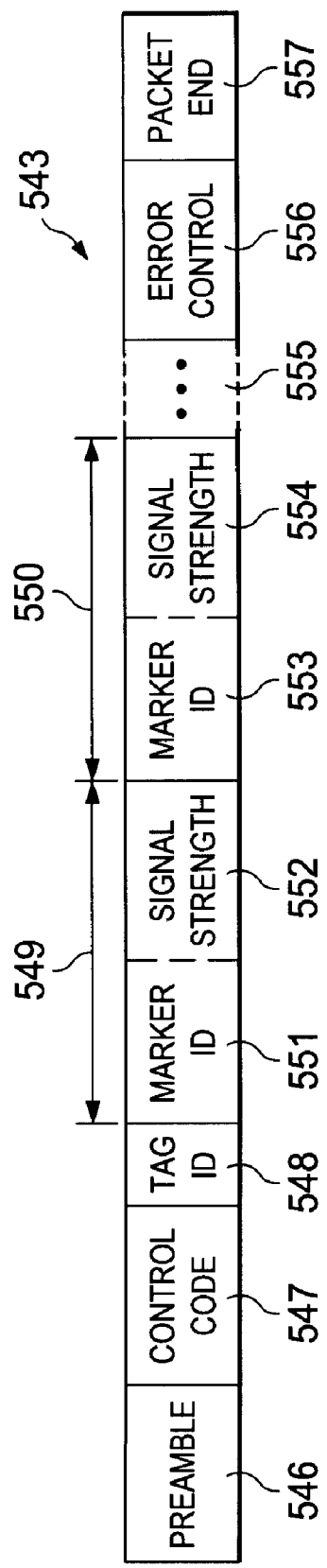
FIG. 20 is a diagrammatic view of a digital word present in a tag signal transmitted by the tag of FIG. 16.

FIG. 20 is a diagrammatic view of a digital word 543 that is present in the tag signal 476 transmitted from the tag 446 to the reader 419. The digital word 543 begins with a preamble 546, followed by a control code 547. The control code 547 identifies for a receiving device the purpose and format of the digital word 543. The next field 548 contains the unique identification code 448 of the tag 446.

The digital word 543 then has several field groups, two of which are shown at 549 and 550. Each field group corresponds to a respective one of the location markers 426-429. The field group 549 has two fields 551 and 552 that respectively contain the marker identification field 534 and signal strength field 535 extracted from the digital word 529 received from one of the location markers. The field group 550 contains two fields 553 and 554 that respectively contain the marker identification 534 and signal strength 535 extracted from the digital word 529 received from a different location marker. The digital word 543 has a section 555 that contains for each of the other location markers a field group similar to the field groups 549 and 550. For simplicity and clarity, it is assumed that the digital word 543 of FIG. 20 contains this type of information as received from all of the location markers. But as a practical matter, in situations involving a large number of location markers, it may be necessary to split this data up and to send it in two or more wireless transmissions 476 from the tag 446 to the reader 419. The section 555 may possibly also contain still other fields that are not relevant to this discussion, and that are not illustrated and described here in detail. The digital word 543 ends with an error control field 536 and a packet end field 557.

The reader 419 extracts relevant information from the digital word 543, and forwards it to the central system 462. The central system 462 uses this information to accurately determine the exact location of the tag 446. In more detail, within field group 549, the field 551 uniquely identifies a particular location marker, and the signal strength value in field 552 represents the distance between that marker and the tag 446. Similarly, within field group 550, the field 553 uniquely identifies a different location marker, and the signal strength value in field 554 represents the distance between that particular marker and the tag 446. Consequently, given this type of information for three or more location markers, the central system 462 can use triangulation to accurately determine the current location of the tag 446.

Thus, when the tag 446 is in the position shown in solid lines in FIG. 16, the central system 462 receives information from which it can accurately calculate the location of the tag. Later, when the tag is in the position 457, the central system 462 receives information that allows it to again accurately calculate the location of the tag, and this occurs yet again when the tag is in the position 458. After the central system has calculated the location of the tag for the position shown in solid lines and for the position 457, the central system can then calculate a direction of movement and a speed of movement for the tag 446, or in other words a motion vector 536 (FIG. 16). Similarly, after the central system 462 has calculated the location of the tag for each of the positions 457 and 458, the central system can again calculate a direction of movement and a speed of movement, or in other words a further motion vector 564 (FIG. 16). These calculations are represented diagrammatically at 466 in FIG. 16.

Figure 21:
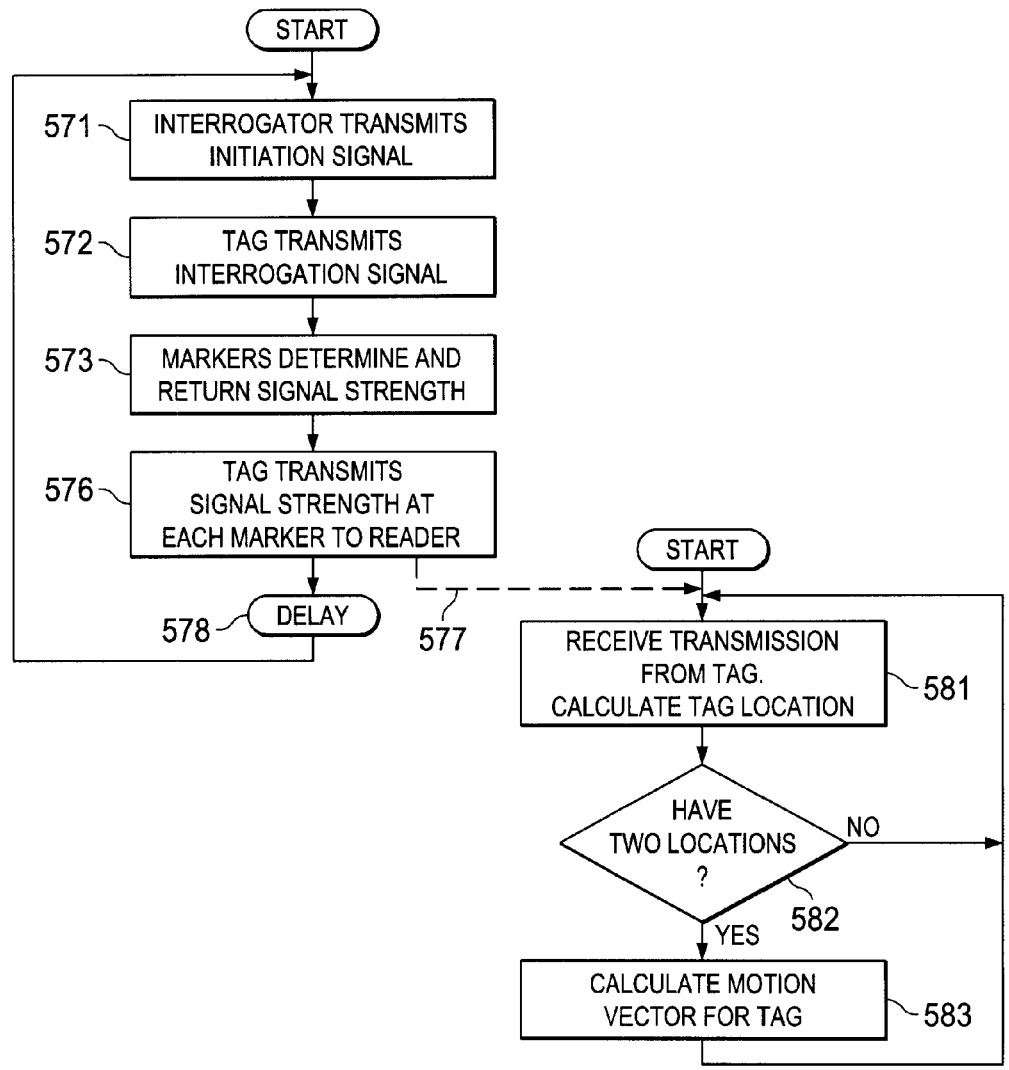
FIG. 21 is a flowchart providing a high-level summary of a sequence of events that occurs during operation of the apparatus of FIG. 16.

FIG. 21 is a flowchart providing a high-level summary of a sequence of events that occurs during operation of the apparatus 410 of FIG. 16. In block 571, the interrogator 418 transmits the initiation signal 468 to all tags in its vicinity, including the tag 446. In block 572, the tag transmits the interrogation signal 469 to each of the location markers 426-429. In block 573, each of the location markers determines the signal strength of the interrogation signal 469 as received at that location marker, and returns this signal strength to the tag 446 in a respective one of the marker signals 471-474. Then, in block 576, the tag takes the signal strength information from all of the markers, and transmits this information to the reader 419 in the tag signal 476. This transmission is indicated diagrammatically at 577 in FIG. 21. There is then a delay 578 before, in block 571, the interrogator 418 transmits the next initiation signal 468.

Meanwhile, at block 581, the central system 462 receives through the reader 419 the signal strength information transmitted by the tag. The central system knows the locations of the location markers, and uses triangulation to calculate the current location of the tag. Then, in block 582, the central system checks to see whether it has calculated two successive locations for this particular tag. If not, then the central system returns to block 581 in order to wait for the transmission from tag 446. Otherwise, the central system proceeds to block 583, where it calculates a motion vector for the tag 446, such as those shown at 563 and 564 in FIG. 16.

In a variation of the operation of the apparatus 410 of FIG. 16, the interrogator 418 transmits the initiation signal 468, the tag transmits the interrogation signal 469, and then the location markers 426-429 transmit their respective marker signals 471-474, as discussed above. But at this point, the reader 419 directly receives the marker signals 471-474, as indicated diagrammatically by broken lines in FIG. 16. The tag 446 ignores the marker signals 471-474, and does not transmit the tag signal 476 containing the digital word 543 (FIG. 20). Instead, the marker signals 471-474 that are directly received by the reader 419 include, for each location marker, the fields 533-535 from the digital word 529 (FIG. 19). These fields contain the tag identification code, the respective marker identification code, and the signal strength of the tag's interrogation signal as received as that location marker. The central system 462 thus receives all of the same information as before, but without the overhead and delay of routing this information through the tag 446. The central system 462 therefore has the information it needs to calculate the location and/or a motion vector for the tag 446.

FIG. 22 is a diagrammatic view of an apparatus 610 that is an alternative embodiment of the apparatus 410 of FIG. 16. Similar and identical components are identified by the same reference numerals in both figures, and the following discussion focuses primarily on the differences. In this regard, the location markers 426-429 in the apparatus 410 of FIG. 16 have been replaced with location markers 626-629. The location markers 626-629 are equivalent to the location markers 426-429, except that they do not include the receiver 432 and the signal strength evaluation circuit 433. In addition, the tag 446 in the apparatus 410 has been replaced with a tag 646 in the apparatus 610. The tag 646 is similar to the tag 446, except that it also has a signal strength evaluation circuit 433 associated with its receiver 432.

Figure 23:
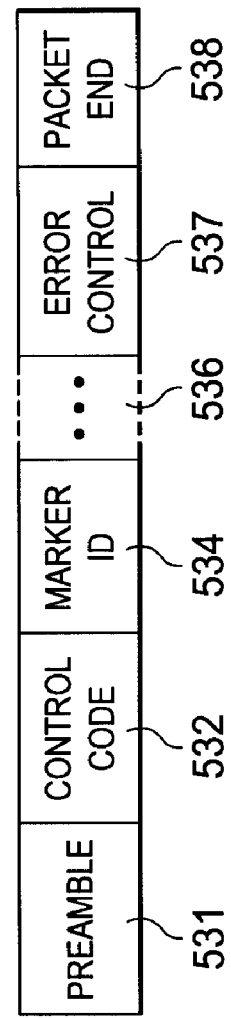
FIG. 23 is a diagrammatic view of a digital word present in marker signals transmitted by the location markers of FIG. 22.

In operation, the location markers 626-629 each periodically transmit respective marker signals 471-474. FIG. 23 is a diagrammatic view of a digital word 681 that is present in each of the marker signals 471-474. The digital word 681 is similar to the digital word 529 shown in FIG. 19, except that the digital word 681 does not include the fields 533 and 535, which respectively contain a tag identification code and a signal strength value. Periodically, the interrogator 418 transmits the initiation signal 468, containing the digital word 501 (FIG. 17). In response to the initiation signal, the tag 646 prepares the digital word 543 (FIG. 20). To populate the field groups 549 and 550, the tag uses information extracted from marker signals 471-474 that it has recently received from the location markers, where the signal strength values 552 and 554 represent the received strength of the respective marker signals, as determined by the signal strength evaluation circuit 433 in the tag 646. The tag then transmits this digital word 543 to the reader 419, and the reader 419 forwards information from this digital word to the central system 462. The central system 462 then calculates the current location of the tag, and typically also a motion vector.

Figure 24:
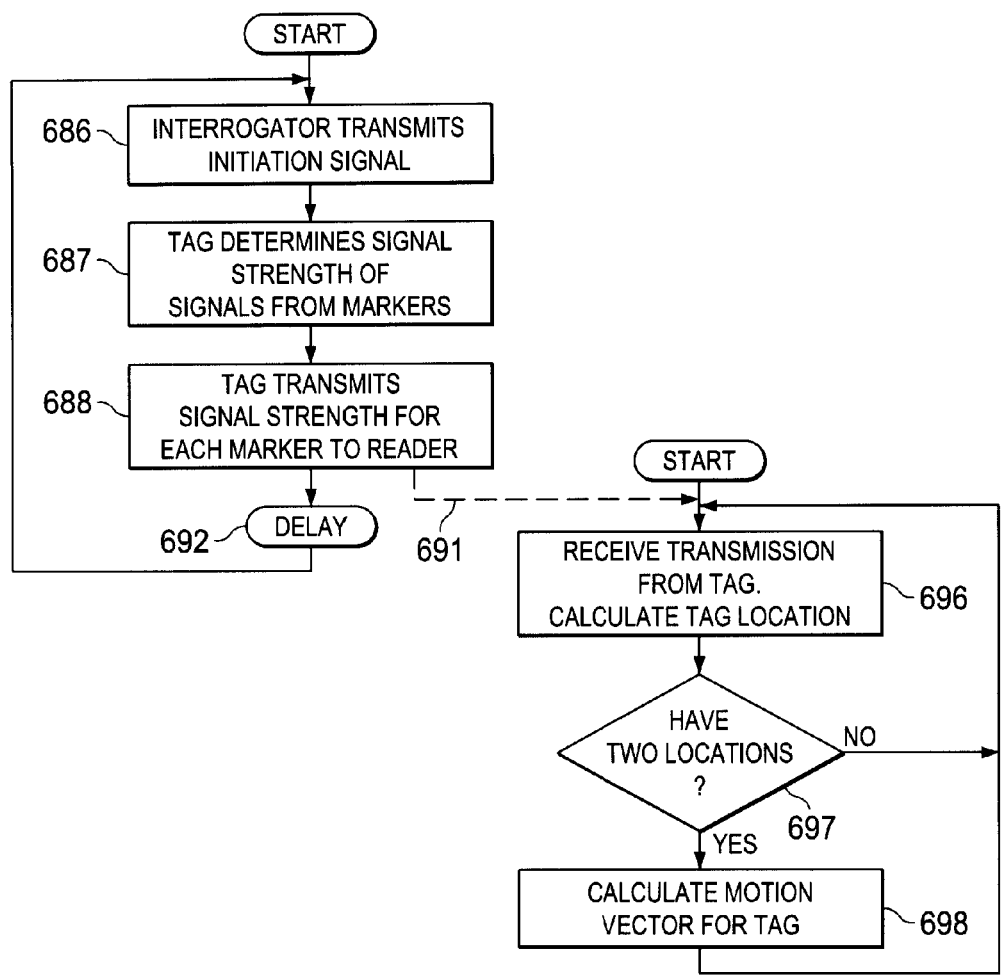
FIG. 24 is a flowchart providing a high-level summary of a sequence of events that occurs during operation of the apparatus of FIG. 22.

FIG. 24 is a flowchart providing a high-level summary of a sequence of events that occurs during operation of the apparatus 610 of FIG. 22. In block 686, the interrogator 418 transmits the initiation signal 468. In block 687, the tag collects information from and about recently-received marker signals 471-474, including their signal strengths. In block 688, the tag transmits the tag signal 476 containing the digital word 543. In FIG. 24, this transmission is indicated diagrammatically at 691. There is then a delay 692 before, at block 686, the interrogator 418 transmits the next initiation signal.

In block 696, the control system 462 receives through reader 419 information from the transmitted tag signal 476, and uses this information to calculate the current location of the tag. If it is determined in block 697 that the central system has calculated two locations for the tag, then control proceeds to block 698, where the central system calculates a motion vector for the tag, such as that shown at 563 or 564 in FIG. 22.

The central system 68 shown in each of FIGS. 1, 7 and 11 calculates a location for the tag 76, 276 or 376 using GPS information, and/or signal strength information. In a variation the central system 68 could also use two different tag locations calculated for different points in time to determine a motion vector, including direction of movement and speed of movement.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
    a first device that receives first wireless signals containing positioning information,
        and that transmits second wireless signals containing first information,
        said first information including an identification code uniquely identifying said first device, and said first information including position information based on said positioning information as recently received by said first device; and
    a second device one of said first and second device being movable relative to the other thereof,
        said second device transmitting third wireless signals containing second information,
        said second information including an identification code uniquely identifying said second device; wherein said first and second devices collectively include ranging circuitry that determines an estimate of a distance between said first and second devices, one of said first information and said second information including said estimate as recently determined by said ranging circuitry; and
    wherein said second device receives said second wireless signals, and
        transmits fourth wireless signals containing third information,
        said third information including an identification code of said first device,
        said identification code of said second device, and position information based on said position information in said first information.

2. An apparatus according to claim 1,
    wherein said first device receives said third wireless signals;
    wherein said ranging circuitry includes a signal strength evaluating section that is disposed in said first device and that determines a received strength of said third wireless signals; and
    wherein said estimate is in said first information, and is said received strength as recently determined by said evaluating section.

3. An apparatus according to claim 1, wherein said position information in said third information and said position information in said second first information each include said positioning information.

4. An apparatus according to claim 1, including a reader that receives said fourth wireless signals.

5. An apparatus according to claim 2, including a plurality of third devices, said second device being movable relative to said third devices, and each said third device:
    receiving said first and third wireless signals;
    having a signal strength evaluating section that determines a received strength of said third wireless signals, said received strength representing an estimate of a distance between said second device and that said third device; and
    transmitting fifth wireless signals containing fourth information, said fourth information including an identification code uniquely identifying that said third device, said received strength as recently determined by said evaluating section in that said third device, and additional position information based on said positioning information from said first wireless signals as recently received by that said third device.

6. An apparatus according to claim 5, wherein said second device receives said fifth wireless signals, and transmits sixth wireless signals containing fifth information, said fifth information including said identification codes of each of said third devices, and further position information based on said position information in said first information and said position information in said third information from each said third device.

7. An apparatus according to claim 1,
    wherein said ranging circuitry includes a signal strength evaluating section that is disposed in said second device and that determines a received strength of said second wireless signals; wherein said estimate is in said second information, and is said received strength as recently determined by said evaluating section; and wherein said second information includes said identification code of said first device, and position information based on said position information in said first information.

8. An apparatus according to claim 7, wherein said position information in said second information and said position information in said first information each include said positioning information.

9. An apparatus according to claim 7, including a reader that receives said third wireless signals.

10. An apparatus according to claim 1, including a plurality of third devices, said second device being movable relative to said third devices, and each said third device:
    receiving said first wireless signals; and
    transmitting fifth wireless signals containing fourth information, said fourth information including an identification code uniquely identifying that said third device, and position information based on said positioning information from said first wireless signals as recently received by that said third device.

11. An apparatus according to claim 10,
    wherein said second device receives said fifth wireless signals from each said third device;
    wherein said ranging circuitry includes a signal strength evaluating section that is disposed in said second device, that determines a received strength of said second wireless signals, and that determines a received strength of said fourth wireless signals from each said third device;
    wherein said estimate is in said second information, and includes said received strength for said first wireless signals and said received strength for said fourth wireless signals from each said third device, as recently determined by said evaluating section; and wherein said second information includes said identification code of said first device, said identification codes for each of said third devices, and position information based on said position information in said first information and said position information in said third information from each said third device.

12. An apparatus according to claim 1, wherein said position information in said first information includes said positioning information.

13. An apparatus according to claim 1,
wherein said first device transmits fifth wireless signals that include fourth information, said fourth information including said identification code of said first device;
wherein said second device receives said fifth wireless signals;
wherein said ranging circuitry includes a signal strength evaluating section that is disposed in said second device and that determines a received strength of said fifth wireless signals; and
wherein said estimate is in said second information, and is said received strength as recently determined by said evaluating section.

14. An apparatus according to claim 13, wherein said first device receives said third wireless signals, said first information including said identification code of said second device, and information based on said received strength from said second information.

15. An apparatus according to claim 13, including a reader that receives said second wireless signals.

16. An apparatus according to claim 13, including a plurality of third devices, said first device being movable relative to said third devices, and each said third device:
receiving said fifth wireless signals;
having a signal strength evaluating section determines a received strength of said fifth wireless signals; and
transmitting sixth wireless signals containing fourth information, said fourth information including an identification code uniquely identifying that said third device, and said received strength as recently determined by said evaluating section in that said third device.

17. An apparatus according to claim 16, wherein said first device receives said third wireless signals and said sixth wireless signals, said first information including said identification code of said second device, said identification code of each said third device, said received strength from said second information, and said received strength from said fourth information from each said third device.

18. An apparatus according to claim 16, including a carrier that has said first device supported thereon, and that moves along predetermined paths of travel in relation to said second and third devices.

19. An apparatus according to claim 1, wherein said first wireless signals are satellite signals.

20. An apparatus according to claim 19, wherein said first wireless signals are global positioning system (GPS) signals.

21. An apparatus according to claim 1, wherein said first device includes a sensor that senses an ambient condition in the region of said first device, said first information including a sensor reading recently obtained from said sensor.

22. An apparatus according to claim 21, wherein said ambient condition is one of an ambient temperature, an ambient humidity, an ambient pressure, an ambient moisture level, an ambient level of radiation, and an ambient concentration of a selected gas.

23. An apparatus according to claim 1, including a signpost that receives said first wireless signals, and that transmits wireless signpost signals that include position information based on said positioning information in said first wireless signals, and an identification code uniquely identifying said signpost.

24. An apparatus according to claim 23, wherein said signpost includes a sensor that senses an ambient condition in the vicinity of said signpost, said signpost signals further including a sensor reading recently obtained from said sensor.

25. An apparatus according to claim 24, wherein said ambient condition is one of an ambient temperature, an ambient humidity, an ambient pressure, an ambient moisture level, an ambient level of radiation, and an ambient concentration of a selected gas.

26. An apparatus comprising:
a plurality of first devices that are spaced from each other, that each have a transmitter section, and that each have a respective unique identification code;
a second device that is movable relative to said first devices, that includes a transmitter section, and that has a unique identification code; and
an interrogator section that wirelessly transmits a first interrogation command at a first time and a second interrogation command at a second time, said second device being responsive to said first Command and for effecting a first transmission of wireless signals to cause generation of a first set of estimates of respective distances between said second device and each of said first devices, and being responsive to said second command for effecting a second transmission of said wireless signals to cause generation of second set of estimates of the respective distances between said second device and each of said first devices;
wherein one of said second device and each of said first devices transmits the wireless signals containing said identification code thereof;
wherein said first and second devices collectively include ranging circuitry that determines at a first time the first set of estimates, and each of said first devices, and
that determines at a second time subsequent to said first time the second set of estimates;
wherein for each said first device, one of said second device and that said first device transmits wirelessly from said transmitter section thereof information that includes the identification code for said second device, the identification code for that said first device, said estimate from said first set corresponding to that said first device, and said estimate from said second set corresponding to that said first device.

27. An apparatus according to claim 26, including:
a reader having a receiver section that receives said information transmitted wirelessly; and
a direction determination section that is coupled to said reader, and that determines as a function of said information an approximate direction of movement of said second device between said first and second times.

28. An apparatus according to claim 26,
wherein said wireless signals are transmitted by said second device;
wherein each of said first devices includes a receiver section that receives said wireless signals; and
wherein said ranging circuitry includes in each of said first devices a ranging section that determines, for each of said first and second sets, said estimates for that said first device as a function of said wireless signals received by that said first device.

29. An apparatus according to claim 28, wherein each said ranging section includes a signal strength evaluating section that determines a received strength of said wireless signals, each of said estimates in said first and second sets being a respective said received strength.

30. An apparatus according to claim 28, wherein said information for each said first device is wirelessly transmitted by that said first device.

31. An apparatus according to claim 28,
wherein each said first device transmits wireless signals that include the identification code for that said first device, said estimate from said first set for that said first device, and said estimate from said second set for that said first device;
wherein said second device includes a receiver section that receives said wireless signals from each of said first devices; and
wherein said information for each said first device is wirelessly transmitted by said second device.

32. An apparatus according to claim 26,
wherein said wireless signals are transmitted by said first devices;
wherein said second device includes a receiver section that receives said wireless signals from said first devices;
wherein said ranging circuitry includes in said second device a ranging section that determines said estimates for each of said first and second sets, said estimates being a function of said wireless signals received by said second device; and
wherein said information for each said first device is wirelessly transmitted by said second device.

33. An apparatus according to claim 32, wherein said ranging section includes a signal strength evaluating section that determines a received strength of said wireless signals, each of said estimates in said first and second sets being a respective said received strength.

34. An apparatus according to claim 26, wherein said first devices are located near a chokepoint.

35. An apparatus according to claim 26, wherein one of said second device and each said first device:
includes circuitry that receives wireless signals containing positioning information; and
transmits wirelessly from said transmitter section thereof information that includes said positioning information.

* * * * *